Oct. 16, 1923. Re. 15,700

W. KAISLING

IGNITION SWITCH

Original Filed April 4, 1918 2 Sheets-Sheet 1

Inventor:
William Kaisling
By Curtis Bloomp.
Attorney

Oct. 16, 1923. Re. 15,700

W. KAISLING

IGNITION SWITCH

Original Filed April 4, 1918 2 Sheets-Sheet 2

Inventor:
William Kaisling
By Curtis B. Camp.
Attorney

Reissued Oct. 16, 1923.

Re. 15,700

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

IGNITION SWITCH.

Original No. 1,395,679, dated November 1, 1921, Serial No. 226,622, filed April 4, 1918. Application for reissue filed March 17, 1922. Serial No. 544,642.

*To all whom it may concern:*

Be it known that I, WILLIAM KAISLING, a citizen of the United States of America, and resident of Chicago, county of Cook, and State of Illinois, have invented certain new and useful Improvements in Ignition Switches, of which the following is a specification.

My invention relates to electrical switches in general, and has to do more particularly with switches for controlling a plurality of circuits. The present embodiment of my invention is constructed more particularly for use in connection with ignition or light circuits for automobiles or the like. An object of my invention is the provision of a switch of the class described which embodies desirable features and advantages all in a simple, efficient and economical manner; and to the accomplishment of this object and such others as may hereinafter appear, the invention consists in the novel details of construction, parts and combination of parts hereafter described, and particularly pointed out in the appended claims.

For a better understanding of my invention, reference may be had to the accompanying drawings, in which like reference characters in the different views denote like parts, and in which.

Figures 1, 2, 3, 4, 5, 6, 7:
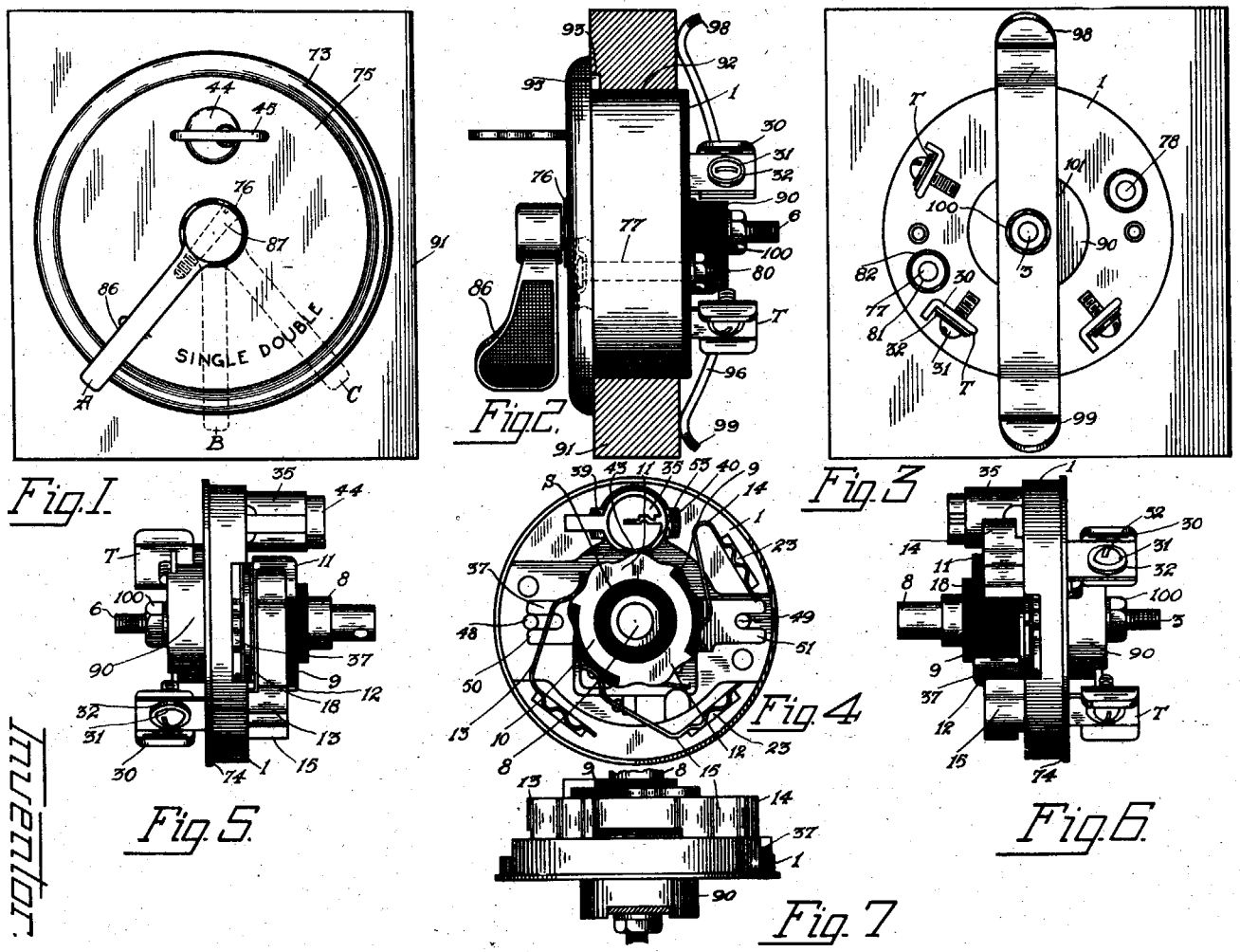
Fig. 1 is a face view of the switch of my invention.
Fig. 2 is a right side view of Fig. 1.
Fig. 3 is a rear view of Fig. 1.
Fig. 4 is an interior face view of the mechanism with the casing and cap removed.
Fig. 5 is a left side view of Fig. 4.
Fig. 6 is a right side view of Fig. 4.
Fig. 7 is a bottom view of Fig. 4 omitting the apparatus on the back of the mounting plate.

Referring now in general to my invention as illustrated, it comprises a switching unit S having a normal position A and two operating positions B and C. When the switch is in position B, a single set of spark plugs are placed in operative relation with the ignition apparatus, and when in position C two or a double set of spark plugs are placed in operative relation with the ignition apparatus. While I have described the switch in connection with a certain arrangement, I wish it understood that I do not wish to be limited to this particular arrangement, as the switch of my invention may be adapted for many other uses without departing from the spirit of the same.

I have not shown my device connected up with any particular circuit arrangement, but it is, of course, apparent that it may be used in connection with various circuit arrangements and that the device may be used as a switch for controlling lighting circuits as well as for controlling igntion circuits. The particular switch shown in the drawings was arranged to be used in connection with a single and a double ignition circuit, so I have shown the arrangement of the contact springs and contact maker accordingly.

I also provide a locking mechanism L which consists preferably of a standard tumbler lock which controls a sliding locking plate which is adapted to lock the switch in its normal position only. If the switch is in either of its operative positions B or C, and the operator attempts to operate the lock, he is at once made aware of the fact that the switch is in one of its operative positions due to the fact that the key can only be turned part way. The switch must be moved to its normal or inoperative position A before the lock can be operated to lock the switch and the key withdrawn.

Referring now more in detail to my invention as illustrated, it comprises preferably a mounting base or plate 1 made of any suitable insulating material, such as bakelite or the like, the said base being molded of this insulating molding material into the desired shape. The mounting base or plate 1 is provided with a central opening 2 of a size to receive the stud 3, which stud serves as a support for the switching unit S. The middle portion of the stud has a hexagonally shaped shoulder portion 4 which sets into a hexagonally shaped orifice 5 formed in the plate 1, to prevent the stud 3 from being rotated in the opening 2. The threaded portion 6 of the stud 3 receives a nut 7, which nut 7 when screwed in place holds the stud 3 in place in the mounting plate 1.

The switching unit S is constructed of two parts, namely, the supporting stud 8, and a cylinder 9. The cylinder 9 is preferably molded in the form illustrated in Figs. 4 to 10, and is made of any suitable insulating material that can be properly shaped or molded, such as bakelite or the like. A conducting plate 10 is provided, and is preferably set in the cylinder 9, during the molding of the same, the said plate 10 having turned over portions 11 and 12 turned down at right angles to the said plate 10 to form conducting segments which cooperate with the contact springs 13, 14 and 15. The cylinder 9 is provided with a central orifice 16 of a size to just receive the supporting stud 8, which stud 8 is provided with an orifice 17, into which the stud 3 fits, thus rotatably supporting the unit S as a whole upon the stud 3. The cylinder 9 is forced onto the stud 8, so as to form a forced fit. A plate 18 is staked to the stud 8, and is provided with a pin 19, which pin is suitably staked to the plate 18, the said pin 19 extending into a suitable opening 20 in the cylinder 9. The pin 19 may be molded in the cylinder 9 and then riveted over when the plate 18 is put in place and staked to the stud 8. An insulating washer 21 is placed between the plate 18 and the cylinder 9 to insulate the portions 11 and 12 of the plate 10 from the plate 18. The pin 19 which extends into the cylinder 9 locates the said cylinder 9 in relation to the plate 18, and also forms a connection between the said cylinder 9 and stud 8, so that when the unit S is moved to its several different positions, the cylinder 9 is rotated therewith. The plate 18 is operatively associated with the locking mechanism L, as will be more fully hereinafter described. The springs 13, 14 and 15 are all similar in shape and are all secured to the mounting plate 1 in a similar manner so that by describing the method of securing the spring 13 a further description of the others will be unnecessary. The spring 13 is provided with a tongue 22 which is forced into a suitable opening 23 in the plate 1, the said opening 23 being slighty smaller than the tongue 22, so as to produce a forced fit. The spring 13 is provided with shoulders 24 which rest against the top surface of the plate 1 when in position, and with shoulders 25 which extend slightly beyond the bottom surface of the plate 1. The shoulders 25 are staked to hold the spring 13 in position and to prevent it from being withdrawn from the plate 1. The springs 13, 14 and 15 may be formed right in the base when it is cast. The free end of the spring 13 is rounded to form a contact portion 26 for engagement with the conducting portions 11 and 12 of the plate 10. The spring 13 normally rests in the concave portion 27 of the annular surface 28 of the cylinder 9.

Figure 12:
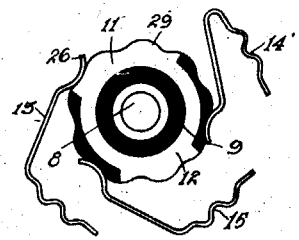
Figs. 12, 13 and 14 illustrate the normal and two actuated positions of the switch unit.
Figure 13:
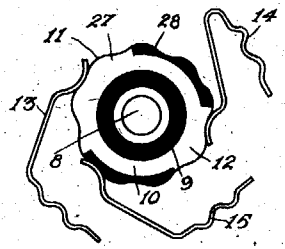
Figure 14:
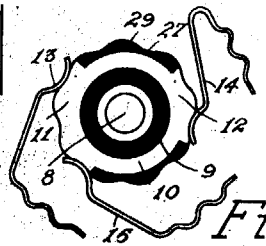

To produce a snap action when the switching unit S is moved to its different positions, the surface 28 of the cylinder is corrugated or formed into concave portions 27, and the conducting segments 11 and 12 are also corrugated or provided with concave portions so that when the switching unit S is in positions A, B and C, as illustrated in Figs. 12, 13 and 14, the free ends of the springs 13, 14 and 15 rest in these concave portions 27 to hold the switch S in position to prevent it from accidentally turning. Now, when the switching unit S is moved from one position to another, the contacting ends 26 of the springs 13, 14 and 15 leave the furrows 27 and ride upon the ridges 29, and due to the springs 13, 14 and 15 being under tension, when the said springs leave the ridges 29 they tend to turn the switching unit S, thus producing a snap action for the said unit S. and at the same time the springs 13, 14 and 15 hold the said switching unit S in its new position. The springs 13, 14 and 15 have their respective tongues 22 protruding through the rear portion of plate 1 to form connecting terminals T. A clamping member 30 is provided for each of the springs 13, 14 and 15, and provides means for securing electrical conductors to the said springs. A screw 31 is provided with a lock washer 32 for securely holding the electrical conductors between the said switch spring tongues 22 and the contacting surfaces of the clamping members 30.

When the switching unit S is in its normal position A, the circuit is open at the contact springs 14 and 15, the said springs resting at this time upon insulated portions of the surface 28 of the cylinder 9, and contact springs 13 engaging segment 11. When the switching unit S is moved to position B, the contact spring 14 engages the segment 12, and owing to the fact that contact spring 13 is already engaging segment 11, as clearly illustrated in Fig. 12, a circuit is closed from one of these springs to the other through the plate 10. If the switching unit S is moved to its position C, then contact spring 13 remains in contact with segment 11, and contact spring 14 also remains in engagement with segment 12, but contact spring 15 now engages segment 11, thus connecting all three springs together through said plate 10.

A locking arrangement whereby the switch unit may be locked against movement is provided, and includes a well-known tumbler lock 35, which is set into a recess 36 formed in the plate 1, said lock being operatively associated with a slidable locking plate 37. The barrel 38 of the lock 35 is provided with a pair of downwardly extending lugs 39 and 40 which fit into a suitably formed recessed opening 36 which is provided with two notches 41 and 42, disposed in the said recess 36, to receive the two downwardly extending lugs 39 and 40 of the lock 35. The notches 41 and 42 are a trifle smaller than the size of the lugs 39 and 40 of the lock 35 so that the said lugs must be forced into the notches 41 and 42 to insure a firm seat for the lock 35. The switch cover also operates to retain the lock 35 in position, as will be more fully hereinafter explained. The lock 35 is provided with a pin 43 which is fastened to the cylinder 44 of the lock 35 in any suitable manner so that when the key 45 is turned the pin 43 moves with the cylinder 44.

The locking mechanism L includes a sliding lock plate 37 set in an orifice 46 of the plate 1. An oblong opening 47 is provided in the locking plate 37, through which the stud 3 extends, to permit the plate 37 to move to the right or left as the case may be when the lock is turned to lock or unlock the switch. The oblong opening 47 and pin limits the movement of the said plate 37. Pins 48 and 49 are set or formed in recesses 46 of the plate 1, preferably being set in the said plate 1 during the molding of the same. These pins 48 and 49 fit between the bifurcated ends 50 and 51 of the plate 37 and form guiding means for the plate 37 when said plate is moved to the right or left in locking or unlocking the switch. The plate 37 is provided with an extension 52 which has its end 53 turned up at right angles to the said plate and located so that it is in the path of the pin 43 of the cylinder 44 of the lock 35 for purposes to be more fully hereinafter described. The plate 37 is provided with a lug 54, preferably formed integral therewith, the said lug 54 being struck up from the plate 37, and cooperating with the plate 18 of the unit S, as will be more fully pointed out in describing the operation of the locking mechanism.

Figure 9:
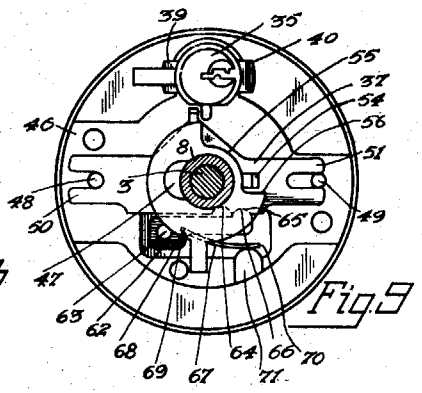
Fig. 9 is a view similar to Fig. 8 showing the locking mechanism in operated position.
Figure 11:
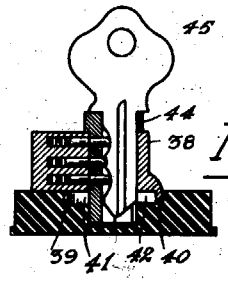
Fig. 11 is a sectional view of the locking device.
Figure 15:
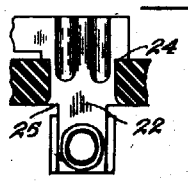
Fig. 15 is a partial sectional view showing the method of inserting the contact springs into the mounting plate.
Figure 8:
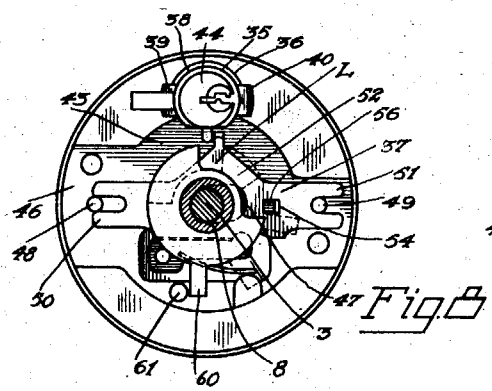
Fig. 8 is a view of the interior mechanism with parts removed to more clearly show the locking arrangement, the switching lever being at normal and unlocked.
Figure 10:
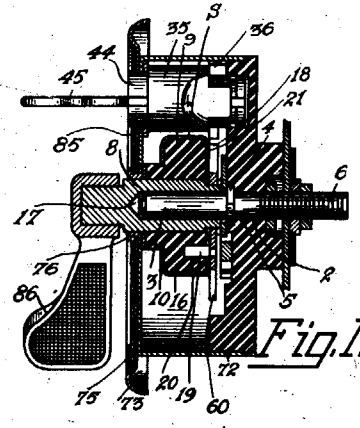
Fig. 10 is a sectional view along the line 10—10 of Fig. 4.

In Fig. 8, I have shown the locking mechanism L and switching unit S in their normal positions, and in Fig. 9 I show the locking mechanism L operated and the switching unit S locked in its normal position. To lock the unit S, the key 45 is turned until the pin 43 engages the upturned lug 53 of the plate 37. The plate 37 then moves to the left into the position shown in Fig. 9. The plate 18 of the unit S, which is also associated with the locking mechanism, has a notch 55 cut in the periphery of the same, as shown in Figs. 8 and 9. When the plate 37 is moved into locking position, the lug 54 is moved to the left into the notch 55 of the plate 18. Now, should an attempt be made to move the unit S to its position B, the shoulder 56, formed by the notch 55 being cut in the plate 18, engages the lug 54 and prevents any movement of the switching unit S. Assuming now that the switch unit S is in either of its positions B or C, and the operator attempts to lock the switch, the key 45 can be turned only part way until the pin 43 engages the lug 53 of the plate 37. Now, any further attempt at turning the key 45 is halted, due to the lug 54 of the plate 37 engaging the periphery 58 of the plate 18, thereby preventing the pin 43 from moving the locking plate 37 to the left. The key 45 cannot be withdrawn when it is in this position, and this unsuccessful attempt to turn the key 45 will indicate to the operator that the switch unit S is in an "on" position and must be restored to its position A or "off" before the switch can be locked.

In Fig. 8, I have shown the plate 18 in full lines in its normal position, and have shown it in dotted lines in its B and C positions. Plate 18 is provided with an arm 60 formed integrally therewith, which is adapted to engage a post 61, set in the plate 1 during the moulding of the same, to limit the movement of the switch unit S in one direction. The arm 60 is adapted to engage the lug 54 to limit the movement of the switch unit S in the other or counter-clockwise direction. When the plate 18 is in its normal position and the locking plate 37 has been operated to lock the switch against actuation, then the arm 60 engages the pin 61 to prevent movement of the plate 18 in a clockwise direction, and the shoulder 56 of the plate 18 engages the stud 54 of the plate 37 to limit the movement of the plate 18 in a counter-clockwise direction. To yieldingly hold the plate 37 in its locked or unlocked positions, I provide an arm 62 pivoted to the plate 1 by means of the pivot pin 63. Notches 64 and 65 are provided in the plate 37 in which the nose 66 of the arm 62 rests. The arm 62 is spring-pressed into said notches by means of the spring 67 which has one end 68 inserted in a slot 69 in the arm 62. The free end 70 of the spring bears against a suitable lug 71 formed integrally with the base plate 1.

A cap 72 is provided to enclose the mechanism, and a top or name plate holder 73 is also provided. The mounting plate 1 has an annular shoulder 74 upon which the cap 72 rests when in position. The name plate holder 73 is dished to receive the name plate 75, and a ferrule 76, which passes through suitable openings in the holder 73 and name plate 75, is spun over the name plate 75 and holder 73 to hold the two in alignment. Studs 77 and 78 are suitably staked to the holder, and pass through suitable openings in the cap in the plate 1. The portions 80 of the studs 77 and 78 which protrude beyond the rear of the plate 1 are threaded to receive nuts 81. Split lock washers 82 are placed between the nut 81 and the plate 1 to lock the said nut 81 in place when screwed down to hold the holder 73 and cap 72 securely to the plate 1. The holder 73, name plate 75, and cap 72 are provided with suitable openings 85 for the lock 35. The ferrule 76 is of a size to allow the passage of the stud 8, which stud is adapted to receive the operating lever 86. The lever 86 is held in place by means of the screw 87, which passes through a suitable opening in the stud 7 and has screw-threaded engagement with a tapped orifice in the lever 86, as shown in dotted lines in Fig. 1. The operating lever is grasped by the operator to move the unit S to its different operative positions and back to normal, the lever being shown in dotted lines in its operative positions B and C in Fig. 1.

It will be observed that the just described organization provides a desirable mounting arrangement, and also particularly in the respect of its provision of means for affixing ornamental escutcheon plates, or it may be name plates, having different letterings to switches that may have been otherwise manufactured as a single lot. It employs an orifice at or in which one of the controlling elements of the switch (in the present instance the stud 8) is set. By lining the orifice with a ferrule, one end being spun over an orifice in the name plate and the inwardly projecting ferrule end being spun over an element within (in the present instance, a main supporting member for the switch). A very economical and firm assembly is provided while at the same time beauty of the visible part of the switch is conserved in that there are no exposed special fastenings attaching the ornamental or designing plate such as screws, rivets heads or the like. If the spun-over part of the ferrule is left exposed, all that is seen is a very neat metal ring lining the periphery of an orifice in which one of the working elements is set, but it is evident that it is wholly a matter of which appearance one prefers whether the ferrule is left visible at all or not. In the structure disclosed, for example, it would be visible or invisible depending on the size of the hub part of the handle 86, or if the lock orifice were the one ferruled, on whether or not the lock had a peripheral lip.

I also illustrate in Figs. 1, 2 and 3 the preferred method employed for mounting the switch as a whole to the cowl dash of an automobile. The mounting plate 1 is provided with a circular extension 90 through which the threaded end of the stud 3 protrudes. The cowl dash 91 of the automobile has a suitable orifice 92 cut in it of a size to receive the said casing 72. A notch 93 is cut in the periphery of the opening 92 of a size to receive a pin 95 which is staked to the casing 72, the said pin 95 centering the switch in the opening 92 and also preventing the switch from turning in the said opening 92. A spring clamp 96 is provided which has a central opening of a size to receive the threaded end of the stud 3. The clamp spans the switch and is of a length so that its free ends 98 and 99 rest against the inner surface of the cowl dash 91. A nut 100 is provided which has screw-threaded engagement with the stud 3, and when the nut 100 is screwed down against the clamp 96 the said clamp is forced down against its normal tension into a channel 101 which is cut in the extension 90. A split lock washer 102 is placed between the nut 100 and the clamp 96 to lock the nut 100 in position after the switch is secured to the cowl dash 91. The central portion of the clamp rests in the channel 101 preventing the clamp from rotating about the stud 3 due to the jar of the automobile. The edge of the holder 73 is held tightly against the face of the cowl dash due to the spring clamp 96, and the switch as a whole is securely held in place in the opening 92 against rotation or displacement.

While the invention has been described with particular reference to the details of construction, it is to be understood that it is not limited thereto, as many changes and modifications may be made therein without departing therefrom and I, therefore, do not wish to be limited to the exact structure as shown, but aim to cover all such changes and modifications which come within the spirit and scope of the appended claims.

What I claim as new and desire to secure by United States Letters Patent, is:

1. A device of the character described including a mounting plate, a pin secured to said plate, a contact maker provided with an orifice adapted to receive said pin, thereby rotatably supporting said contact maker, a locking member supported by said plate for locking said contact maker against movement, a pin carried by said locking member, a second pin supported by said mounting plate, a member secured to said contact maker, and an integrally formed ear for said member adapted to cooperate with said pins to limit the movement of said contact maker.

2. A device of the character described including a mounting plate, a pin secured to said plate, a contact maker provided with an orifice adapted to receive said pin to rotatably support said contact maker, a locking member supported by said plate for locking said contact maker against movement, a pin carried by said locking member, a second pin supported by said mounting plate, a member carried by said contact maker adapted to cooperate with said pins to limit the movement of said contact maker, and a cover-cap for holding said contact maker in position.

3. A device of the character described including a mounting plate, an oscillatory contact maker supported by said plate, a slidable locking plate provided with an upturned portion, a circular plate connected to said contact maker, a portion of said plate being cut away and adapted to receive the upturned portion of said slidable locking plate to prevent movement of said contact maker in one direction, a pin secured to said mounting plate and a dependent arm formed integrally with said circular plate adapted to engage said pin to prevent movement of said contact maker in the other direction.

4. A device of the character described including a mounting plate, an oscillatory member supported by said plate and carrying a movable contact, a plate attached to said oscillatory member, a slidable locking plate provided with a locking element, a portion of the plate secured to said oscillatory member being cut away to receive said locking element to prevent movement of said oscillatory member in one direction, and a pin secured to said mounting plate cooperating with the plate attached to said oscillatory member for preventing said oscillatory member from being moved in the opposite direction when the locking plate is in its operative position to lock the oscillatory member against actuation.

5. A device of the character described including a mounting plate, a pin secured to said mounting plate, an oscillatory member rotatably supported by said pin, a slidable locking element provided with bifurcated end portions, a pair of pins supported by said mounting plate and projecting into the bifurcated end portions of said slidable locking plate to guide the movement of the same, a circular plate secured to said oscillatory member and provided with a protruding portion, a stud formed integrally with said slidable locking plate, and a limiting pin secured to said mounting plate, said stud and said last pin cooperating with the protruding portion of said circular plate to limit the movement of said oscillatory member.

6. A device of the character described including a mounting plate, a pin secured to said mounting plate, an oscillatory member rotatably supported by said pin and having a normal and an off-normal position, a slidable locking plate lying between said mounting plate and said oscillatory member, a locking element carried by said locking plate, a circular plate carried by said oscillatory member, a portion of said circular plate being cut away to receive said locking element only when said oscillatory member is in normal position, a stud secured to said mounting plate, and an extension for said circular plate adapted to cooperate with said stud and said locking element to limit the movement of said oscillatory member when the locking plate is in its unlocked position.

7. A device of the character described including a mounting plate, an oscillatory member rotatably supported by said mounting plate and having a normal and an off-normal position, a slidable locking plate suitably supported by said mounting plate and provided with an upturned locking element, a circular plate secured to said oscillatory member, a portion of said circular plate being cut away to receive said locking element when said oscillatory member is in its normal position to lock the same against actuation, said circular plate preventing said slidable locking plate from being actuated when said oscillatory member is in its off-normal position.

8. A device of the character described including a mounting plate, an oscillatory member rotatably supported by said mounting plate and having a normal and an off-normal position, a slidable locking plate suitably supported by said mounting plate and provided with an upturned locking element, a circular plate secured to said oscillatory member, a portion of said circular plate being cut away to receive said locking element when said oscillatory member is in its normal position to lock the same against actuation, said circular plate preventing said slidable locking plate from being actuated when said oscillatory member is in its off-normal position, thereby warning the operator of the lock that said oscillatory member is in its off-normal position.

9. A device of the character described including a mounting plate, a pin secured to said mounting plate, an oscillatory member rotatably supported by said pin and having a normal and an off-normal position, a slidable locking plate lying between said mounting plate and said oscillatory member, a locking element carried by said locking plate, a circular plate carried by said oscillatory member, a portion of said circular plate being cut away to receive said locking element only when said oscillatory member is in normal position, said locking element and circular plate cooperating when the oscillatory member is in its off-normal position to prevent the locking of said oscillatory member, said circular plate and locking element adapted to prevent rotation of said oscillatory member in one direction when said oscillatory member is in its normal position, and other means for preventing said oscillatory member from rotating in the opposite direction when it is in its normal position.

10. A device of the character described including a mounting plate, an oscillatory member supported by said plate carrying a movable contact, a cover for said device for preventing movement of said oscillatory member, a slidable locking plate provided with a locking element, a circular plate attached to said oscillatory member, a portion of said plate being cut away to receive the locking element of said slidable locking plate to lock said contact maker in position against actuation in one direction, and other means for preventing actuation of said oscillatory member and said circular plate in the other direction.

11. A switch of the character described having a cup-shaped containing member and a flange for clamping the switch on a support, said flange being dished, a front cover for the switch fitting into the dished portion of the flange, a ferrule having one end turned down peripherally about an orifice in said cover and holding said cover in assembly position with respect to said member and said flange, a mounting plate, a manually operated controlling element for said switch at said ferrule and supported on one side of said mounting plate, said ferrule giving access to the interior of the switch for the operation of said element, and a clamping device for said switch secured on the other side of said mounting plate for cooperating with said clamping flange to secure said switch in its mounted position.

12. A switch of the character described having an element with an orifice and a controlling member exposed at said orifice extending into the switch structure, a supporting member for said switch, a cover for the front of the switch having an orifice registering with said first orifice, a ferrule extending through said registering orifices and having its two ends spun down on said element and said cover, and a member secured to the back of said switch for co-operating with said element to secure said switch to said supporting member.

13. An electrical switch for automobiles or the like including a rotatable switch handle and contacts within the switch structure adapted to be shifted by means of said handle, a supporting member provided with an opening for receiving said switch, an inwardly extending shaft for said handle, a cover-plate for the front of the switch having an orifice, a mounting plate adapted to serve as a clamp to support the switch, said mounting plate having an orifice registering with said first orifice, said shaft passing through both said orifices, a ferrule extending through both orifices and having one end turned down on said cover plate and the other on said mounting plate to hold said first plate in assembly position with respect to the second, and a yielding member secured to the back of said switch and adapted to span the opening in said supporting member and to co-operate with said mounting plate to secure said switch in said supporting member.

14. An electrical switch having a movable switch part at the front of said switch, said part extending inwardly, a cover plate having an orifice at which said part is exposed, a ferrule having one end holding said plate, said ferrule having an inwardly extending portion engaging a switch element behind said cover plate to hold said plate in position, and means secured to the back of said electrical switch for co-operating with said switch element to clamp said switch in its mounted position.

15. A switch of the character described including a face plate, a second plate having a flange, and yielding means secured to said switch for co-operating with said flange as a clamping element to support the switch as a whole, a ferrule extending through both said plates, said ferrule having one end turned over on said first plate and the other end turned over within the switch to hold said first plate on said second plate, and a manually operable element for the switch within said ferrule.

16. A switch of the character described including a plate adapted to serve as a clamping element for supporting the switch as a whole, a cup-shaped element within which movable parts of the switch are mounted, means for holding said plate and cup shaped element rigidly together, a front cover for the switch, a manually operated controlling element for said switch extending through said plates said cover, and a ferrule having one end turned down on said cover and holding said cover in position with respect to said plates, and a member secured to the back of said switch for co-operating with said first plate to clamp said switch in its mounted position.

17. A switch of the character described having a front case plate and a front clamping member for holding the switch on a support, a front cover for the switch, a ferrule supporting said cover in assembly position with respect to said plate and said member, said ferrule giving access to the interior of said switch, a movable element operated through said ferrule, and a member, having its ends turned up, secured to the back of said switch for co-operating with said front clamping member for yieldingly clamping said switch in its supported position.

18. A switch of the character described including a front plate, a front cover, a ferrule supporting said cover in assembly position with respect to said plate, a movable element for said switch at said ferrule, said ferrule giving access to the interior of the switch in the operation of said element, a mounting member having an orifice for receiving said switch, and a member secured to the back of said switch and adapted to span the orifice in said mounting member and to cooperate with said front cover to yieldingly hold said switch in said mounting member.

19. A switch of the character described having a front plate and cooperating means including a member at the back of said switch for yieldingly holding said switch on a support, a front cover for said front plate, a ferrule supporting said cover in assembly position with respect to said plate, a manually operable element for said switch located at said ferrule, said ferrule giving access to the interior of the switch.

Signed by me at Chicago, in the county of Cook and State of Illinois, this 14th day of March, 1922.

WILLIAM KAISLING.